United States Patent
Wang

(10) Patent No.: US 9,787,184 B2
(45) Date of Patent: Oct. 10, 2017

(54) MULTIPLE-PHASE POWER CIRCUIT

(71) Applicant: HON HAI PRECISION INDUSTRY CO., LTD., New Taipei (TW)

(72) Inventor: Tzyy-Gang Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 79 days.

(21) Appl. No.: 14/749,075

(22) Filed: Jun. 24, 2015

(65) Prior Publication Data

US 2016/0072389 A1 Mar. 10, 2016

(30) Foreign Application Priority Data

Sep. 9, 2014 (TW) ............... 103131016 A

(51) Int. Cl.
*H02M 3/158* (2006.01)
*H02M 1/32* (2007.01)
*H02M 3/335* (2006.01)
*H02M 1/00* (2006.01)

(52) U.S. Cl.
CPC ............ *H02M 3/158* (2013.01); *H02M 1/32* (2013.01); *H02M 3/1584* (2013.01); *H02M 3/33507* (2013.01); *H02M 2001/008* (2013.01)

(58) Field of Classification Search
CPC ............... H02M 1/32; H02M 3/33507; H02M 2001/008; H02M 3/158; H02M 3/1584
USPC ........................................................ 323/271
See application file for complete search history.

(56) References Cited

U.S. PATENT DOCUMENTS

| 5,499,184 A * | 3/1996 | Squibb | H02M 3/33523 363/100 |
| 7,792,166 B2 * | 9/2010 | Borschowa | H01S 5/0683 323/283 |
| 7,881,077 B2 | 2/2011 | Hsu | |
| 8,610,375 B2 | 12/2013 | Chang et al. | |
| 8,710,810 B1 * | 4/2014 | McJimsey | H02M 3/1584 323/272 |
| 2006/0279969 A1 * | 12/2006 | Leung | H02M 3/33515 363/41 |

FOREIGN PATENT DOCUMENTS

| CN | 100461595 C | 2/2009 |
| CN | 201490701 U | 5/2010 |
| CN | 101783581 A | 7/2010 |
| CN | 201674212 U | 12/2010 |
| CN | 102136723 A | 7/2011 |

(Continued)

*Primary Examiner* — Kyle J Moody
(74) *Attorney, Agent, or Firm* — Steven Reiss

(57) ABSTRACT

A multiple-phase power circuit includes multiple voltage conversion units, a pulse-width modulation (PWM) signal generator and a surge detection circuit. Each voltage conversion unit converts an input voltage to a driving voltage of a pre-set phase. The pulse-width modulation (PWM) signal generator is coupled to the voltage conversion units to output PWM signals of different phases to the voltage conversion units. The surge detection circuit samples the input voltage and compares the input voltage with a reference voltage. Then the surge detection circuit outputs multiple first control signals. The PWM signal generator further stops outputting the PWM signals of different phases when the PWM signal generator receives the multiple first control signals.

8 Claims, 5 Drawing Sheets

(56) References Cited

FOREIGN PATENT DOCUMENTS

| | | |
|---|---|---|
| TW | 550444 | 9/2003 |
| TW | 201012299 A | 3/2010 |
| TW | 201106587 A | 2/2011 |
| TW | 201414206 A | 4/2014 |
| TW | 201424216 A | 6/2014 |

* cited by examiner

MULTIPLE-PHASE POWER CIRCUIT

FIELD

The subject matter herein generally relates to power circuits, more particularly to a multiple-phase power circuit with a digital signal processor (DSP).

BACKGROUND

A multiple-phase power with a digital signal processor (DSP) is a power using DSP to control multipath voltage conversions and monitor status of voltage, current and temperature. The analog-digital (AD) conversion frequencies in most DSP are 200000 hertz (Hz). The AD conversion frequency is not high enough to output corrected voltage when surges occur in input voltages. Thus, the output voltage is so high that an over-voltage protection is triggered by mistake.

BRIEF DESCRIPTION OF THE DRAWINGS

Implementations of the present technology will now be described, by way of example only, with reference to the attached figures.

DETAILED DESCRIPTION

Figure 1:
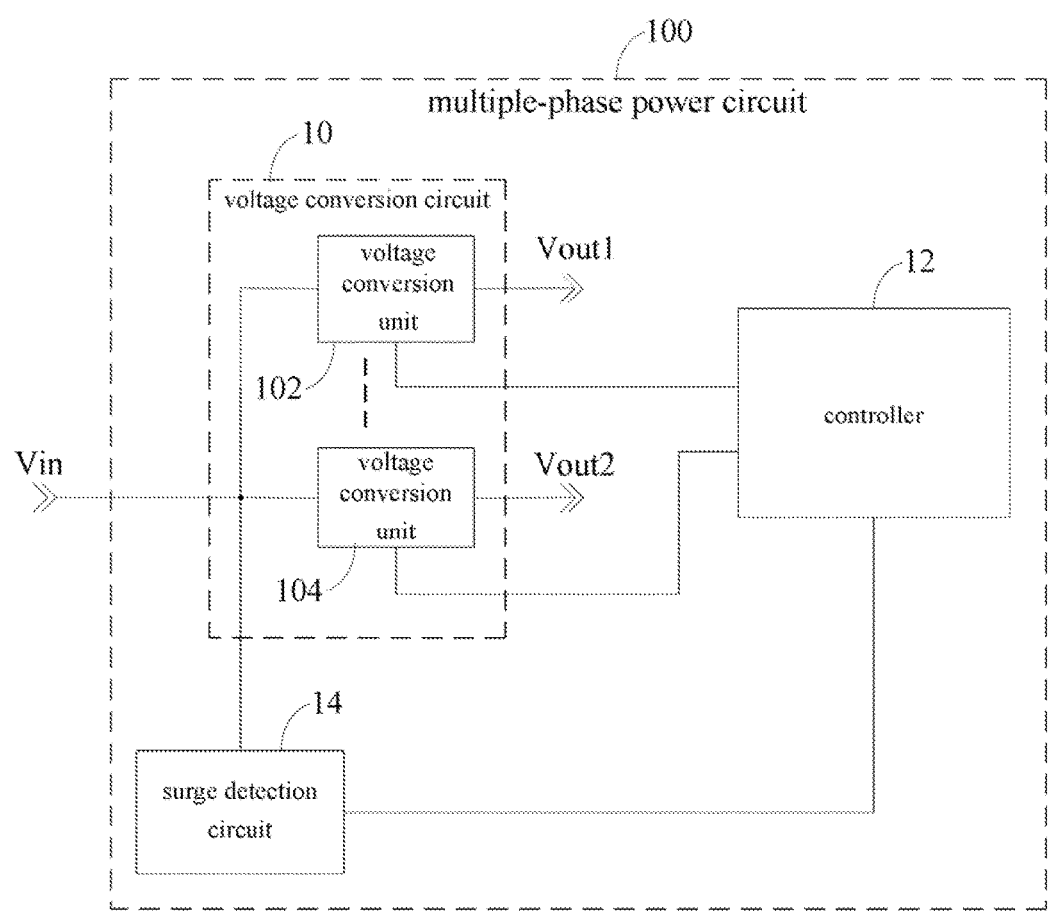
FIG. 1 illustrates a diagrammatic view of a first embodiment of a multiple-phase power circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a multiple-phase power circuit.

FIG. 1 illustrates a diagrammatic view of a first embodiment of a multiple-phase power circuit 100. In at least one embodiment, the multiple-phase power circuit 100 converts an input voltage Vin to multiple driving voltages (Vout1 and Vout2) of different phases. The multiple-phase power circuit 100 includes a voltage conversion circuit 10, a controller 12 and a surge detection circuit 14.

The voltage conversion circuit 10 converts the input voltage Vin to multiple driving voltages. The voltage conversion circuit 10 includes multiple voltage conversion units, such as the voltage conversion unit 102 and the voltage conversion unit 104. In the embodiment, the voltage conversion unit 102 and the voltage conversion unit 104 are included. In other embodiments, the multiple voltage conversion units can be at least one voltage conversion unit.

The controller 12 is coupled to the voltage conversion unit 102 and the voltage conversion unit 104. The controller 12 outputs pulse-width modulation (PWM) signals of different phases to the voltage conversion unit 102 and the voltage conversion unit 104. Thus, the voltage conversion unit 102 converts the input voltage Vin to a driving voltage Vout1 of a first phase. The voltage conversion unit 104 converts the input voltage Vin to a driving voltage Vout2 of a second phase.

The surge detection circuit 14 is coupled to the controller 12, the voltage conversion unit 102 and the voltage conversion unit 104. The surge detection circuit 14 samples the input voltage Vin and compares the input voltage Vin with a reference voltage Vref. According to the comprising result, the surge detection circuit 14 outputs a first control signal.

When the controller 12 receives the first control signal, the controller 12 stops outputting the PWM signals. Thus, when the surge detection circuit 14 detects surges in the input voltage Vin, the controller 12 can avoid the voltage conversion circuit 10 outputting high driving voltages. Thus, the output voltage is not high enough to trigger over-voltage protection by mistake.

When the surge detection circuit 14 does not detect any surges in the input voltage Vin, the surge detection circuit 14 stops outputting the first control signal, the controller 12 does not receive the first control signal. Thus, the controller 12 outputs the PWM signals, and the voltage conversion circuit 10 converts the input voltage Vin to multiple driving voltages as normal.

In at least one embodiment, 2 voltage conversion units (the voltage conversion unit 102 and the voltage conversion unit 104) are included. The phase difference between the driving voltage Vout1 and the driving voltage Vout2 is 180 degrees (360 degrees divided by 2 is 180 degrees). That is, when there are 3 voltage conversion units, the phase difference between the driving voltages is 120 degrees (360 degrees divided by 3 is 120 degrees).

In at least one embodiment, the controller 12 can be a digital signal processor (DSP). The DSP has functions of voltage samplings, temperature detections, over-current detections and PWM signal generations. In other embodiments, the controller 12 can be a control integrated circuit (IC) to process voltage samplings, temperature detections, over-current detections and PWM signal generations, such as a CPU.

Figure 2:
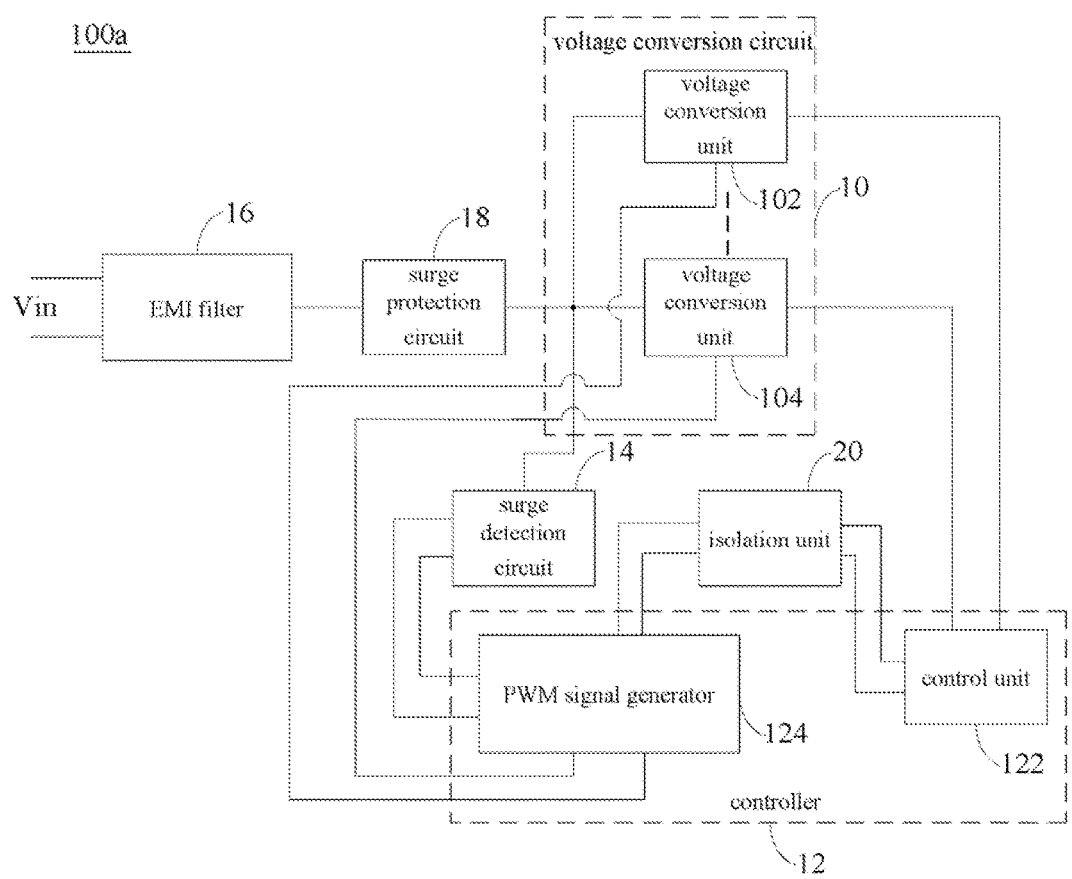
FIG. 2 illustrates a diagrammatic view of a second embodiment of a multiple-phase power circuit.

FIG. 2 illustrates a diagrammatic view of a second embodiment of a multiple-phase power circuit 100a. In the embodiment, differences between the multiple-phase power circuit 100a and the multiple-phase power circuit 100 are that the multiple-phase power circuit 100a further includes an electro-magnetic interference (EMI) filter 16, a surge protection circuit 18 and an isolation unit 20, and the controller 12 further includes a control unit 122 and a PWM signal generator 124.

The EMI filter 16 filters EMI noise in the input voltage Vin. The surge protection circuit 18 is coupled to the EMI filter 16 to filter surge voltages. The isolation unit 20 is coupled between the control unit 122 and the PWM signal generator 124 to isolate the control unit 122 and the PWM signal generator 124. The control unit 122 samples the driving voltage Vout1 and the driving voltage Vout2 sent by the voltage conversion unit 102 and the voltage conversion unit 104. According to the driving voltage Vout1 and the driving voltage Vout2, the control unit 122 outputs a second control signal. The PWM signal generator 124 generates multiple PWM signals of different phases, and sends the multiple PWM signals to the voltage conversion unit 102 and the voltage conversion unit 104 correspondingly. Thus, the control unit 122 controls voltage conversions in the voltage conversion unit 102 and the voltage conversion unit 104. According to the second control signal, the PWM signal generator 124 further adjusts duty cycles of the multiple PWM signals to adjust the driving voltage Vout1 and the driving voltage Vout2.

In the second embodiment, the PWM signal generator 124 further stops outputting the PWM signals when the PWM signal generator 124 receives the first control signal sent by the surge detection circuit 14. Thus, when surges are in the input voltage Vin, the voltage conversion circuit 10 stops the voltage conversions and avoids outputting high driving voltages.

Figure 3:
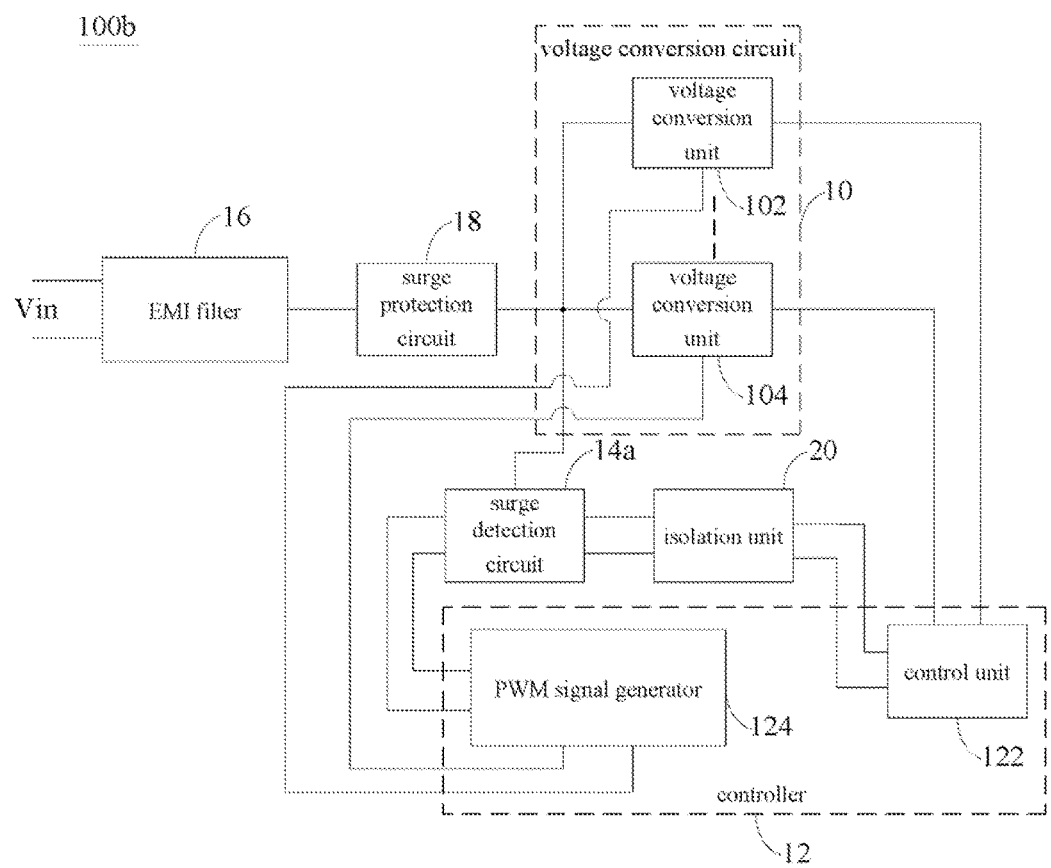
FIG. 3 illustrates a diagrammatic view of a third embodiment of a multiple-phase power circuit.

FIG. 3 illustrates a diagrammatic view of a third embodiment of a multiple-phase power circuit 100b. In the embodiment, differences between the multiple-phase power circuit 100b and the multiple-phase power circuit 100a are that the isolation unit 20 is coupled between the surge detection circuit 14a and the control unit 122, and the surge detection circuit 14a further outputs the first control signal according to the second control signal.

When the surge detection circuit 14a does not detect any surges in the input voltage Vin, the surge detection circuit 14a sends the second control signal to the PWM signal generator 124, and the PWM signal generator 124 adjusts duty cycles of the multiple PWM signals according to the second control signal. Thus, the driving voltage Vout1 and the driving voltage Vout2 can be adjusted.

When the surge detection circuit 14a detects any surges in the input voltage Vin, the surge detection circuit 14a outputs the first control signal according to the second control signal and the comparing result of the input voltage Vin comparing with the reference voltage Vref. When the PWM signal generator 124 receives multiple first control signals, the PWM signal generator 124 correspondingly stops outputting the PWM signals of different phases to the multiple voltage conversion units (the voltage conversion unit 102 and the voltage conversion unit 104).

Figure 4:
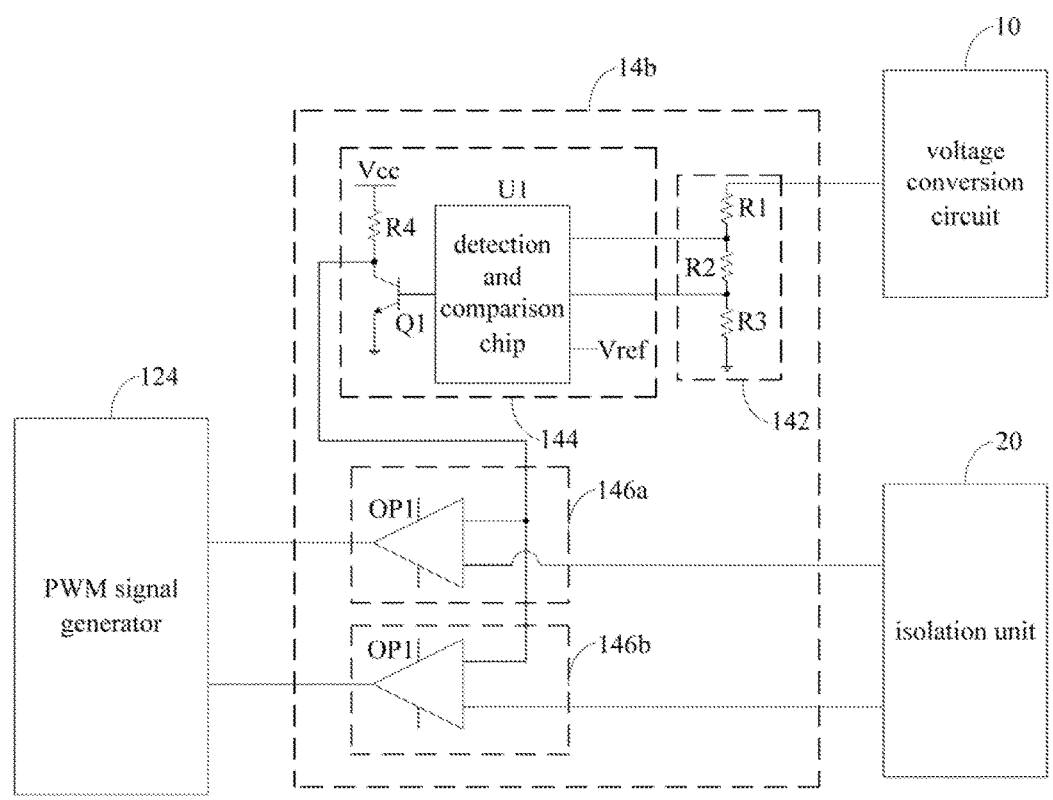
FIG. 4 illustrates a circuit diagram of a first embodiment of a surge detection circuit.

FIG. 4 illustrates a circuit diagram of a first embodiment of a surge detection circuit. In at least one embodiment, the surge detection circuit 14b includes the sampling unit 142, the first comparison unit 144 and multiple second comparison units, such as the second comparison unit 146a and the second comparison unit 146b. The sampling unit 142 samples the input voltage Vin and outputs a first sampling voltage and a second sampling voltage.

The sampling unit 142 includes a resistor R1, a second resistor R2 and a third resistor R3. A first end of the first resistor R1 is coupled to the voltage conversion circuit 10, a second end of the first resistor R1 is coupled to a first of the resistor R2. A second end of the resistor R2 is coupled to a first end of the resistor R3. A second end of the resistor R3 is coupled to ground. The sampling unit 142 adjusts the first sampling voltage and the second sampling voltage by adjusting values of the first resistor R1, the second resistor R2 and the third resistor R3.

The first comparison unit 144 includes a detection and comparison chip U1, a switch Q1 and a fourth resistor R4. A first input end of the detection and comparison chip U1 is coupled between the first resistor R1 and the second resistor R2 to receive the first sampling voltage. A second input end of the detection and comparison chip U1 is coupled between the third resistor R3 and the second resistor R2 to receive the second sampling voltage. A third input end of the detection and comparison chip U1 receives the reference voltage Vref.

A control end of the switch Q1 is coupled to an output end of the detection and comparison chip U1. A first end of the switch Q1 is coupled to the second comparison unit 146a and the second comparison unit 146b. A second end of the switch Q1 is coupled to ground. A first end of the fourth resistor R4 receives a pre-set voltage VCC, a second end of the fourth resistor R4 is coupled to the first end of the switch Q1.

The first comparison unit 144 detects the first sampling voltage and the second sampling voltage via the detection and comparison chip U1. When the reference voltage Vref is smaller than the first sampling voltage, the first comparison unit 144 outputs the comparing result via the switch Q1. When the reference voltage Vref is larger than the second sampling voltage, the first comparison unit 144 stops outputting the comparing result via the switch Q1.

In at least one embodiment, the first sampling voltage is larger than the second sampling voltage. The pre-set voltage VCC can be 3.3 Voltages.

The second comparison unit 146a and the second comparison unit 146b both include comparators OP1. A positive input end of the comparator OP1 is coupled to the isolation unit 20. A negative input end of the comparator OP1 is coupled to the first end of the switch Q1. An output end of the comparator OP1 is coupled to the PWM signal generator 124.

The second comparison unit 146a and the second comparison unit 146b both compare the signal outputted via the switch Q1 with the second control signals sent by the isolation unit 20, then the second comparison unit 146a and the second comparison unit 146b output the first control signals.

In at least one embodiment, the first control signal is a signal of low level voltage. The second control signal is a signal of high level voltage. The voltage level of the comparing result outputted via the switch Q1 is higher than the voltage level of the second control signal.

When the negative input end of the comparator OP1 does not receive the comparing result (the surge detection circuit 14b does not detect any surge voltages), the comparator OP1 outputs a high level voltage. When the negative input end of the comparator OP1 receives the comparing result (the surge detection circuit 14b detects surge voltages), the comparator OP1 outputs a low level voltage. In the embodiment, the switch Q1 can be an NPN transistor or an N-channel Field Effect Transistor (FET).

Figure 5:
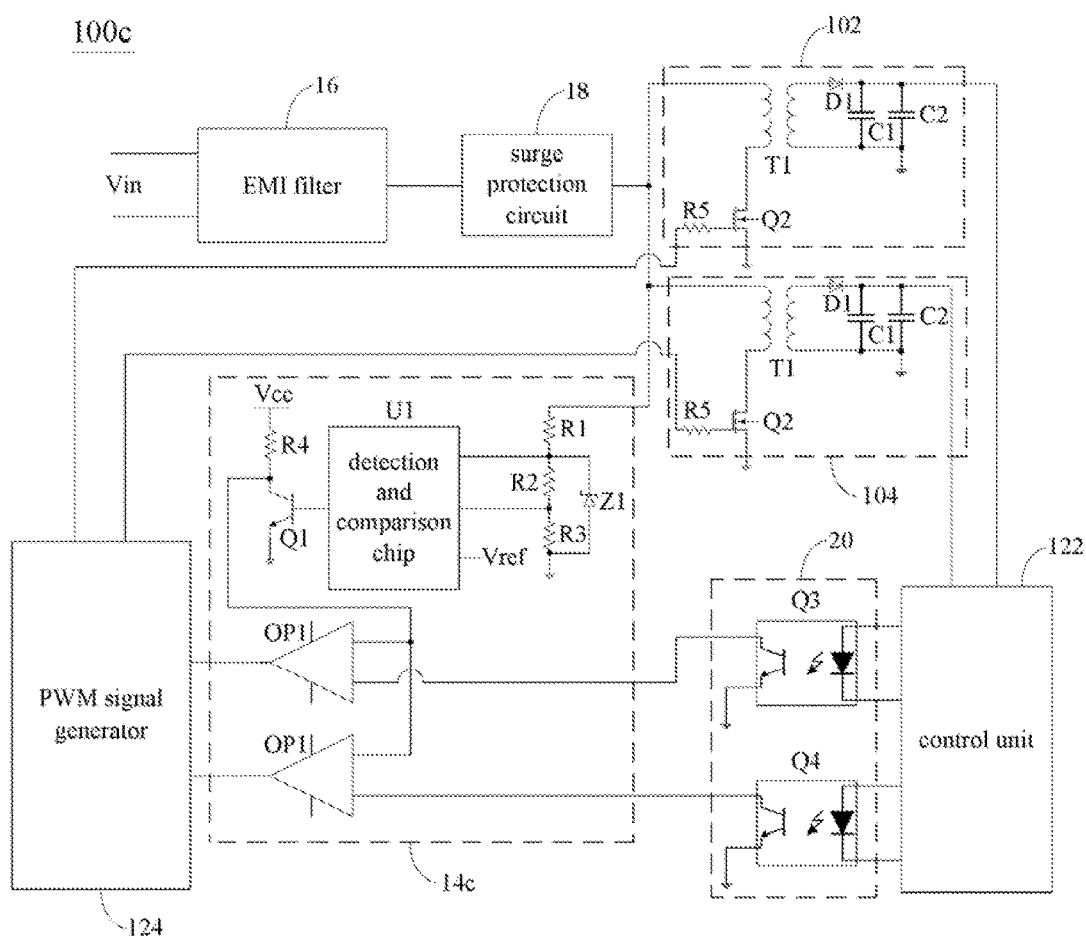
FIG. 5 illustrates a circuit diagram of the third embodiment of a multiple-phase power circuit.

FIG. 5 illustrates a circuit diagram of the third embodiment of a multiple-phase power circuit 100c. The voltage conversion circuit 10 includes the voltage conversion unit 102 and the voltage conversion unit 104. The voltage conversion unit 102 and the voltage conversion unit 104 have the same circuit structure.

The voltage conversion unit 102 includes a transformer T1, a FET Q2, a fifth resistor R5, a diode D1, a first capacitor C1 and a second capacitor C2. A first input end of the transformer T1 is coupled to the surge protection circuit 18 and the first resistor R1. A first output end of the transformer T1 is coupled to a positive electrode of the diode D1. A second output end of the transformer T1 is coupled to ground. A negative electrode of the diode D1 is coupled to a first end of the first capacitor C1. A second end of the first capacitor C1 is coupled to ground. The second capacitor C2 is parallel connected to the first capacitor C1. A first end of the FET Q2 is coupled to a second input end of the transformer T1. A second end of the FET Q2 is coupled to ground. A control end of the FET Q2 is coupled to the PWM signal generator 124.

Thus, the PWM signal generator 124 is capable to control the FET Q2. The diode D1, the first capacitor C1 and the second capacitor C2 together are capable to have a rectifier and a filter on the driving voltage outputted by the transformer T1. In the embodiment, the FET Q2 can be an N-channel FET.

In the embodiment, the difference between the surge detection circuit 14c and the surge detection circuit 14b is that the surge detection circuit 14c further includes a zener diode Z1. The zener diode Z1 protects the detection and comparison chip U1 from high surge voltage damaging.

The isolation unit 20 includes an optical coupler Q3 and an optical coupler Q4. The optical coupler Q3 sends the second control signal to the second comparison unit 146a. The optical coupler Q4 sends the second control signal to the second comparison unit 146b. Input ends of the optical coupler Q3 and the optical coupler Q4 are both coupled to the control unit 122. First output ends of the optical coupler Q3 and the optical coupler Q4 are both coupled to positive input ends of the comparators OP1 respectively. Second output ends of the optical coupler Q3 and the optical coupler Q4 are both coupled to ground.

Many details are often found in the art such as the other features of a multiple-phase power circuit. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms configured in the claims. It will therefore be appreciated that the embodiments described above may be modified within the scope of the claims.

What is claimed is:

1. A multiple-phase power circuit comprising:
   a voltage conversion circuit, comprising multiple voltage conversion units, wherein each voltage conversion unit is configured to convert an input voltage to a driving voltage of a pre-set phase;
   a pulse-width modulation (PWM) signal generator, coupled to the multiple voltage conversion units, configured to output PWM signals of different phases to the voltage conversion units; and
   a surge detection circuit coupled to the PWM signal generator and the voltage conversion units, the surge detection circuit configured to sample the input voltage and compare the input voltage with a reference voltage, and output multiple first control signals; wherein the surge detection circuit comprises:
      a sampling unit, outputting a first sampling voltage and a second sampling voltage according to the input voltage;
      a first comparison unit, wherein the first comparison unit outputs a comparing result when the reference voltage is smaller than the first sampling voltage, and the first comparison unit stops outputting the comparing result when the reference voltage is larger than the second sampling voltage; and
      multiple second comparison units, wherein the multiple second comparison units are configured to compare the comparing result with multiple second control signals, and output the first control signals;
      wherein the first sampling voltage is larger than the second sampling voltage; and
   wherein the PWM signal generator is further configured to stop outputting the PWM signals of different phases when the PWM signal generator receives at least one of the multiple first control signals.

2. The multiple-phase power circuit as claimed in claim 1, further comprising a control unit, wherein the control unit is configured to sample the driving voltage of each voltage conversion unit and output the multiple second control signals.

3. The multiple-phase power circuit as claimed in claim 2, wherein the PWM signal generator further adjusts duty cycles of the PWM signals of different phases according to the second control signals.

4. The multiple-phase power circuit as claimed in claim 2, wherein the surge detection circuit further outputs the multiple first control signals according to the multiple second control signals.

5. The multiple-phase power circuit as claimed in claim 2, further comprising an isolation unit, wherein the isolation unit is coupled between the PWM signal generator and the control unit, the isolation unit is configured to isolate the PWM signal generator and the control unit.

6. The multiple-phase power circuit as claimed in claim 1, wherein the sampling unit comprises:
   a first resistor with a first resistor first end coupled to the voltage conversion circuit;
   a second resistor with a second resistor first end coupled to a first resistor second end; and
   a third resistor with a third resistor first end coupled to a second resistor second end, a third resistor second end coupled to ground.

7. The multiple-phase power circuit as claimed in claim 1, wherein the first comparison unit comprises:
   a detection and comparison chip with a detection and comparison chip first input end receiving the first sampling voltage, a detection and comparison chip second input end receiving the second sampling voltage, a detection and comparison chip third input end receiving the reference voltage;
   a switch with a switch control end coupled to a detection and comparison chip output end, a switch first end coupled to the multiple second comparison units, a switch second end coupled to ground; and
   a fourth resistor with a fourth resistor first end receiving a pre-set voltage, a fourth resistor second end coupled to the switch first end.

8. The multiple-phase power circuit as claimed in claim 1, wherein each of the multiple second comparison units comprises a comparator with a comparator positive input end coupled to the control unit, a comparator negative input end coupled to the first comparison unit, a comparator output end coupled to the PWM signal generator.

* * * * *